United States Patent [19]
Cook et al.

[11] Patent Number: 6,017,265
[45] Date of Patent: Jan. 25, 2000

[54] METHODS FOR USING POLISHING PADS

[75] Inventors: Lee Melbourne Cook, Steelville, Pa.; David B. James; Charles William Jenkins, both of Newark, Del.; Heinz F. Reinhardt, Chadds Ford, Pa.; John V. H. Roberts; Raj Raghav Pillai, both of Newark, Del.

[73] Assignee: Rodel, Inc., Newark, Del.

[21] Appl. No.: 08/782,717

[22] Filed: Jan. 13, 1997

Related U.S. Application Data

[63] Continuation-in-part of application No. 08/480,166, Jun. 7, 1995, abandoned, and a division of application No. 08/344,165, Nov. 23, 1994, abandoned.

[51] Int. Cl.$^7$ ........................................ B24B 1/00
[52] U.S. Cl. ........................ 451/41; 451/59; 451/63; 51/298
[58] Field of Search ................................ 264/126, 127; 428/141, 373; 451/41, 59, 63; 521/155; 51/295, 298

[56] References Cited

U.S. PATENT DOCUMENTS

| | | |
|---|---|---|
| 3,763,054 | 10/1973 | Reischi et al. . |
| 3,917,761 | 11/1975 | Scheuerlein et al. . |
| 4,256,845 | 3/1981 | Morris et al. . |
| 4,664,683 | 5/1987 | Degen et al. . |
| 4,708,839 | 11/1987 | Bellet et al. . |
| 4,728,552 | 3/1988 | Jensen, Jr. . |
| 4,880,843 | 11/1989 | Stein . |
| 4,927,432 | 5/1990 | Budinger et al. . |
| 5,019,311 | 5/1991 | Koslow . |
| 5,216,843 | 6/1993 | Breivogel et al. . |

OTHER PUBLICATIONS

Surface Tech. Review, Rodel Products Corp., vol. 1, Issue 1, pp. 1 and 2, Dec. 1986.

*Primary Examiner*—Timothy V. Eley
*Attorney, Agent, or Firm*—Kenneth A. Benson

[57] ABSTRACT

Polymer-based pads useful for polishing objects, particularly integrated circuits, having interconnected porosity which is uniform in all directions, and where the solid portion of said pad consists of a uniform continuously interconnected polymer material of greater than 50% of the gross volume of the article, are produced directly to final shape and dimension by pressure sintering powder compacts of thermoplastic polymer at a temperature above the glass transition temperature but not exceeding the melting point of the polymer and at a pressure in excess of 100 psi in a mold having the desired final pad dimensions. In a preferred version, a mixture of two polymer powders is used, where one polymer has a lower melting point than the other. When pressure sintered at a temperature not to exceed the melting point of the lower melting powder, the increased stiffness afforded by incorporation of the higher melting polymer component gives improved mechanical strength to the sintered product. Conditions for producing the pads of this invention are such that the polymer powder particles from which the pads are produced essentially retain their original shape and are point bonded to form the pad.

8 Claims, 4 Drawing Sheets

METHODS FOR USING POLISHING PADS

This application is a continuation-in-part of application Ser. No. 08/480,166, filed Jun. 7, 1995, now abandoned, and a division of application Ser. No. 08/344,165 filed Nov. 23, 1994, also abandoned.

BACKGROUND OF THE INVENTION

1. Field of the Invention

The present invention relates to an article of manufacture which is extremely useful as a component used in the polishing of materials, particularly semiconductor crystals and integrated circuits based on silicon wafers. In polishing, the material to be polished (the workpiece) is attached to a flat cylindrical carrier and pressed against a rotating table upon which is attached a polishing pad, generally a sheet of polymeric material. An aqueous suspension of fine particles (the slurry) is poured onto the polishing pad so as to wet the contacting surfaces. The slurry-lubricated friction between workpiece and pad results in the wearing away of surface asperities on the workpiece and the production of a smooth, featureless polished workpiece surface.

For many polishing processes, particularly those operating at high rotational speeds or pressures, inadequate slurry flow across the pad/workpiece boundary gives rise to non-uniform polishing rates, poor surface quality in the finished article and deterioration of the polishing pad due to frictional heating or plastic flow of the pad polymers. Non-uniform slurry transport is commonly cited as a primary cause of polishing rate variation, particularly in the polishing of integrated circuits, a process commonly termed planarization. In planarization polishing, the pad ideally contacts only the outer surface asperities of the integrated circuit workpiece and wears them away, resulting in a finished wafer which has virtually no surface height variation across its surface, a state known as global planarity. Global planarity is required for ensuring adequate focus in subsequent photolithographic process steps in the fabrication of the final integrated circuit.

2. Description of Related Art

In response, many prior art polishing pads have been developed with improved properties. Most improvements for high speed high pressure polishing depend on improving the resistance of the pad structure to plastic flow effects (pad glazing), and ensuring that the pad is readily permeable to slurry. Most of the pads commonly employed for planarization applications exhibit pronounced pad glazing effects, which manifest themselves as a continuous reduction in rate over time. To alleviate this problem, a number of prior art refinements, typified by U.S. Pat. No. 5,216,843 have been disclosed whose purpose is to rejuvenate, or dress, the pad by abrading its surface. This extra step adds to both the cost of the process and provides an additional source of variability. Thus an ideal planarization pad would be one which provides high and stable rates without the use of a pad dressing process. For planarization applications it is also particularly desirable to have a pad which has sufficient liquid permeability to permit slurry to be delivered from the back surface of the pad directly to the pad/workpiece interface, as described in U.S. Pat. No. 5,232,875. Thus an ideal planarization pad would have high stiffness and hardness to ensure a high degree of preferential removal of surface asperities, yielding high global planarity, would not require pad dressing and possess a good uniform slurry permeability in all directions. No prior art polishing pad fully meets these criteria.

An additional requirement for a polishing pad is that it have a precisely controlled surface shape. This derives from the requirement that the pad uniformly and fully contact the workpiece surface during polishing to effect surface removal. If the pad surface is not highly flat and regular, or if there are appreciable variations in thickness, portions of the workpiece surface will not be in contact with the pad during the polishing process. This non-contacting area will experience a resulting lower rate of removal, giving rise to nonuniformities in the shape of the resulting polished workpiece surface. This problem is greatly magnified as pad stiffness increases and compressibility decreases, as is the case for planarization polishing. Many processes for ensuring proper pad shape have been employed in prior art, such as grinding, buffing, or slicing processes. All of these processes greatly add to the complexity and cost of manufacturing polishing pads. Additionally, most of them do not yield sufficient surface shape accuracy for highly demanding applications such as planarization. For example, typical pad surfacing processes for planarization pads such as Rodel IC1000 (available from Rodel, Inc., Newark, Del.) produce a thickness variation of ~±0.003 in. It would be highly desirable to reduce this to less than ±0.001 in. in order to improve the uniformity of the polishing process. Currently this cannot be done without significant increases in manufacturing cost resulting from the introduction of additional processing steps. Thus, an ideal polishing pad would be one wherein its surface shape and dimensions could be fixed during its initial formation, without subsequent finishing steps, i.e. it could be produced to final net shape with a minimum of manufacturing steps.

All known prior art polishing pads employed by those skilled in the art may be divided into three main classes;

1. Polymer-impregnated felts,
2. Microporous elastomer films (also known as Poromerics), and
3. cellular polymer foams.

The first class of pads are typified by U.S. Pat. No. 4,728,552 and related art. They are generally produced by preparing a fiber-based felt matrix, which is then impregnated with polymer, generally polyurethane. The urethane coats the fiber surfaces and bonds the fibers together into an interconnected elastic composite which has bulk porosity. The bulk porosity allows passage of fresh slurry through the body of the pad and simultaneously serves as a means of passage of workpiece debris and other dross away from the workpiece surface. Such pads are commonly manufactured by preparing a continuous roll or web of felt, impregnating the felt with polymer, curing the polymer, and generating the final pad thickness and lateral dimensions by slicing, buffing, and cutting operations. The process of manufacture is laborious, complex, and difficult to yield pads with highly precise dimensions. It does not produce pads of net shapes directly.

The three dimensional orientation of the bulk pad porosity is largely determined by the three dimensional orientation of the constituent felt fibers. As disclosed in U.S. Pat. No. 4,728,552 the fiber orientation in the felt, while generally considered to be random, is not random in all three dimensions. Generally fiber orientation is largely parallel to the major plane of the felt web. This orientation effect was deliberately exploited by the inventors to effect improvements in pad durability and polishing rate.

As disclosed in U.S. Pat. No. 4,728,552, the urethane phase of such pads is primarily responsible for the polishing activity. Thus, changes in the fraction of urethane making up the outer surface of the pad will result in variations in polishing performance. The urethane fraction at the pad surface is strongly influenced by the nature and extent of bulk porosity exposed at the outer surface of the pad. The non-random, non-isotropic nature of this porosity in impregnated felts therefore results in a high degree of intrinsic performance variability in this class of polishing pads. This variability is widely recognized in the semiconductor industry and is considered a significant impediment to further improvements to semiconductor device fabrication. A serious impediment to the employment of this class of pads in the planarization process is their generally high compressibility due to the necessary high void volume, usually greater than 50%. This low compressibility gives poor global planarity, and such pads are seldom used in the planarization process. While compressibility may be reduced by increasing the fraction of polymer used to infiltrate the felt substrate, the amount required to ensure adequate stiffness results in minimal slurry permeability. It is also extremely difficult to ensure uniform polymer permeation throughout the interior of the substrate at high loadings, resulting in increased property and performance variability.

Pads of the second class, typified by U.S. Pat. No. 4,927,432 consist of porous urethane films coated on to a base material which is often an impregnated felt pad of the first class. These porous urethane films are shown in cross-section to be composed of a series of vertically oriented closed end cylindrical pores (see SurfaceTech Review Vol. 1, no. 1). The high degree of porosity in these pads results in good slurry retention and transport during use. However, it also leads to a high degree of compressibility, making such pads unsuited for flat finishing, high pressure, or planarization applications. In addition, the closed end characteristics of the vertically oriented pores prevent liquid transport through the complete pad thickness, i.e., slurry cannot be fed from the back of the pad to the pad/workpiece interface.

Pads of the third class are typified by filled cast urethane materials such as those sold by Rodel, Inc. under the trade designations IC40, IC60, and IC1000 and blown foam materials, such as Rodel MH. These materials have bulk porosity which is randomly and uniformly distributed in all three dimensions. All known examples of such materials used commercially for polishing are closed cell foams, i.e., the volume porosity is discontinuous, with a solid barrier of polymer material between each void cell in the pad. Thus bulk slurry transport does not occur, and slurry transport characteristics of these materials are very poor. Often such pads are artificially textured with grooves or perforations to improve lateral slurry transport during polishing. In addition, such pads are very prone to pad glazing during polishing; practical use of such pads for planarization requires a regular surface abrasion, termed pad dressing, to regenerate surface texture. Without pad dressing, polishing rates of such pads are variable and undesirably low. While pads of this class are those most commonly employed in planarization polishing, the above cited deficiencies represent significant barriers to their more complete usage.

While open-cell reticulated urethane foams can be produced, as typified by products produced by E. N. Murray Co. under the Foamex trade name, these materials tend to be highly compressible, with low shear strength due to their extremely high void volume fraction, typically above 70%, making them unsuitable for possible use as polishing pads in high speed, high pressure, or planarization applications.

Other methods of producing porous polymer materials have been disclosed for purposes other than the production of polishing pads.

U.S. Pat. No. 3,763,054 discloses a means of producing microporous polyurethane sheeting by melt sintering sheets of loosely bonded particles prepared by drying films of aqueous particle dispersions. The articles prepared were made via free-sintering, i.e. pressure was not applied to assist in the particle sintering process, and film dimensions were not well controlled, the shape of the outer layer of said sintered films was not determined by contact to a mold or master surface.

U.S. Pat. No. 3,917,761 discloses a process of preparing porous sintered polyimide articles useful as oil filled bearings. The process disclosed is a variant of the lost wax process. A mixture of polyimide powder and polyformaldehyde powder were intimately mixed and pressed to a compact or green body at low temperatures (preferably 25° C.) and high pressure (>10,000 psi). This green body was then free-sintered at a temperature well above the melting point of the lower melting polyformaldehyde phase. This caused thermal decomposition of the polyformaldehyde to formaldehyde vapor while the polyimide phase simultaneously melt sintered. The resultant structure was a microporous sintered polyimide article. A major disadvantage of such a process is the evolution of formaldehyde gas, which is now recognized as a carcinogen.

U.S. Pat. No. 4,256,845 discloses a method for manufacturing a porous thermoplastic sheet by gelling an aqueous latex dispersion containing an additional material of a preselected particle size and forming the dispersion into a sheet. This sheet is then free-sintered at a temperature at or above the melt point of the thermoplastic to form the final product from which the additional material is extracted.

U.S. Pat. No. 4,880,843 discloses a similar process for preparing a porous molded composite article of ultra high molecular weight polyethylene combined with a polyethylene wax. The mixture of powders is put into a press mold of final dimensions using a low pressure sufficient only to prevent deformation. The mold and powder is then melt sintered at a temperature in excess of the melting point of the polymer.

In light of the above information, the most desirable polishing pad for high temperature, high pressure or planarization polishing applications would be one which has a high volume of polymer material to ensure low compressibility, high stiffness, and resistance to shear forces, a high and uniform degree of permeability to slurry in all directions and has minimal pad glazing so that pad dressing is not required. It would also be particularly desirable for such pads to be produced by a process which yielded a pad of final shape and dimensions, thus reducing the number of manufacturing steps and improving the dimensional precision of the pad, with corresponding improvements in cost of manufacture and polishing quality.

Accordingly, it is the object of the present invention to provide a process for manufacturing polymer-based pads useful for polishing objects, particularly integrated circuits, which have interconnected porosity which is uniform in all directions so as to provide free and unimpeded transport of slurry through the body of the pad.

It is also the object of the present invention to provide a process which produces pads having said bulk porosity in a form which produces high and sustained polishing rates without pad dressing, said dressing step being rendered optional.

It is a further object of the invention to provide a process which produces said pads directly to final shape and dimension directly from component polymer starting materials with resorting to subsequent shaping operations such as cutting, grinding, or shaping.

SUMMARY OF THE INVENTION

A process is provided which produces polymer-based pads having interconnected porosity which is uniform in all directions, and where the solid portion of said pad consists of a uniform continuously interconnected polymer material of greater than 50% of the gross volume of the article which are produced directly to final shape and dimension by pressure sintering powder compacts of thermoplastic polymer at a temperature above the glass transition temperature but not exceeding the melting point of the polymer and at a pressure in excess of 100 psi in a mold having the desired final pad dimensions. In a preferred version, a mixture of two polymer powders is used, where one polymer has a lower melting point than the other. When pressure sintered at a temperature above the glass transition temperature of the lower melting powder but not to exceed its melting point, the increased stiffness afforded by incorporation of the higher melting polymer component gives improved mechanical strength to the sintered product. In another embodiment of the invention layers of thermoplastic polymer powders or mixtures of thermoplastic polymer powders, each layer of powders having different mechanical properties, are compacted into a mold and sintered at a temperature above the glass transition temperature of the lowest melting polymer in each of the layers but not to exceed the melting point of the lowest melting polymer. In all versions of the invention conditions for producing the pad are such that the polymer powder particles from which the pad is produced essentially retain their original shape and are point bonded to form said pad. The pads therefore have a surface which is friable enough under use that they provide a renewed surface during the polishing process and provide better polishing without conditioning of the pad surface than do pads currently available for polishing of semiconductor wafers. Another aspect of this invention is the method of polishing semiconductor wafers with a pad material of this invention and an abrasive slurry.

DESCRIPTION OF THE PREFERRED EMBODIMENTS

Figure 1:
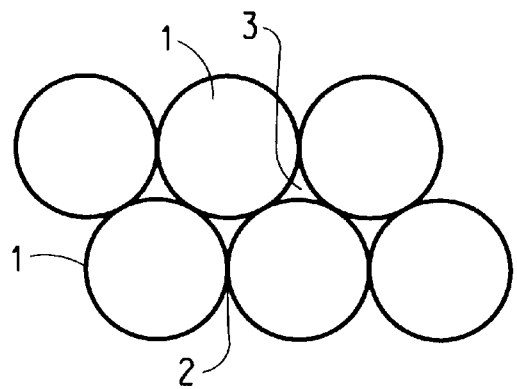
FIG. 1 is a two-dimensional schematic drawing of packed spherical particles.

One of the key features of the present invention is the use of high pressure sintering of polymer powder starting materials in a precisely shaped mold at a temperature below the melting point of the polymer. While a wide variety of sintering processes have been described in the technical literature they are most commonly employed as a means of producing a final theoretically dense product and not a porous body. Moreover, as indicated from the prior art cited above, all known processes for producing porous thermoplastic polymer articles utilize sintering temperatures well above the melting point of the polymer with either no pressure or minimal pressure. Processes occurring in this regime are commonly termed viscous sintering processes and proceed spontaneously and rapidly to form void-free fully densified final products without the imposition of external forces. Such processes are widely employed to produce densified bodies of many different materials including polymers, glasses, ceramics and metals.

Thermoplastic polymers are viscoelastic materials and their temperature/viscosity behavior can be complex. Polymer behavior over a wide temperature range can be classified into three basic regions. At low temperatures, polymers behave as glassy, brittle solids, exhibiting predominantly elastic behavior. The upper temperature boundary for this region is termed the glass transition temperature, Tg. Above Tg but below the melting point of the polymer, viscous characteristics become more significant and polymers exhibit both viscous and elastic effects. In this region, the polymer is capable of considerable deformation when stress is applied. However, when the stress is removed, complete recovery may not occur due to permanent movement and rearrangement of the molecular structure of the polymer. Above the melting point, the polymer behaves predominantly as a viscous liquid, exhibiting permanent deformation when stress is applied.

The processes of the present invention are specifically conducted below the melting point of the thermoplastic polymer employed. This differs from the related art processes cited above, which specifically teach the use of sintering polymers above their melting point in the viscous liquid regime. Reasons for employing liquid regime sintering are; first, the rate of sintering is expected to increase directly with increasing temperature, scaling inversely with the liquid viscosity. Thus liquid regime sintering is relatively rapid, making it economically attractive. Second, liquid regime sintering proceeds spontaneously to full final density without the imposition of external forces, making it ideal for low cost production processes. However there are significant disadvantages as well. The first disadvantage is that the rapidity of liquid sintering for most thermoplastic polymers makes the process difficult to control if a precisely regulated and uniform pore structure is desired. It is particularly difficult to employ viscous sintering above the melting point of the polymer to produce thick porous articles as the thermal gradients which necessarily occur during heating lead to strong in-depth variations in sintering rate and, therefore, in the porosity of the final article. A second disadvantage is that unless some sort of mold or support is employed, substantial deformation of the sintered product will occur due to viscous flow. This is a significant impediment to producing precisely toleranced devices such as polishing pads. An additional problem is the adhesion of the molten polymer to the mold employed, leading to frequent down-time for mold cleaning, product damage, and shortened mold lifetime. A final problem is that many thermoplastic materials exhibit oxidative and thermal decomposition when heated above their melting points. This leads to property degradation and or property non-uniformities.

The present invention avoids the above difficulties by conducting sintering within a temperature interval between the glass transition temperature and the melting point of the lowest melting polymer component utilized. Because the spontaneous rate of sintering is relatively low in this temperature range, high pressures are employed to increase it in a controllable fashion. As applied pressure is transmitted throughout the article to be compacted, the particle sintering rate is essentially uniform throughout the bulk of the material. This largely eliminates porosity gradients in products, making production of relatively thick articles possible. By employing a mold of form of precisely pre-determined dimensions as the means of imposing pressure, individual constituent polymer particles are sintered in a precisely defined shape which corresponds to the mold dimensions. This eliminates final shaping steps in manufacture and prevents any deformation of articles during the sintering process. In addition, the lower temperature range employed largely prevents product deformation and mold adhesion during sintering. Finally, the lower temperatures employed eliminate or minimize thermal decomposition effects. Oxidative decomposition may be easily prevented by introducing inert gases into the mold prior to and during sintering.

Starting materials used for products of the present invention are restricted to thermoplastic polymer powders. This restriction is imposed for several reasons. First, simple solid starting materials may be employed which are readily converted to powder form. This simplifies the production process. Second, there is sufficient thermal stability at temperatures approaching the melt point, allowing uniform articles to be reproducibly manufactured. Third, there are many types of commercially available thermoplastic polymers with a correspondingly wide range of hardnesses, elastic moduli, chemical durability, and abrasion resistance. Thus, a wide variety of products for different applications may be produced using the same manufacturing equipment simply by changing the process temperatures and pressures. Examples of thermoplastic polymers which might be used in the process of the invention are polyurethanes, polyamides, polycarbonates, polyacrylates (including methacrylates and acrylates), polysulfones, polyesters and polyolefins.

The restriction that the starting materials be in powder form is made in order to create a continuous bulk porosity. In the process of the present invention, a premeasured quantity of powdered thermoplastic polymer is poured into a mold and tapped or vibrated to settle the particles. This yields a volume of particles in tangent contact with each other throughout the powder volume. A two-dimensional schematic drawing of this packed state is illustrated in FIG. 1. In the illustration particles 1 are in tangential contact 2. The interparticle void 3 is clearly evident.

In the simplest case, which is hexagonal close packing of monodisperse spherical powder particles, a very high theoretical powder density way be produced. However, commercially available powders have measurable size variation and are generally not spherical. These differences will lead to a change in the solids density of the powdered compact prior to sintering relative to the simplest theoretical case.

While any size particle may be employed to produce a pre-sintered compact the process of the present invention typically uses particle diameters which are small relative to the final sintered part dimensions. In particular, a powder diameter range of 20–100 microns is preferred. This diameter range is selected to enable complex molds having fine surface detail to be easily and completely filled, and in order to produce a macroscopically smooth final pad surface free from large gaps or crevices. This improves the mechanical durability of sintered products and leads to improved polished surface quality when articles are employed as polishing pads.

As sintering proceeds, plastic flow at the particle boundaries 2 leads to particle coalescence and a corresponding shrinkage of the interparticle void volume. In the present invention the time and temperature used for sintering at a given applied pressure are specifically controlled so as to retain a fully interconnected void volume, i.e. sintering is not allowed to proceed to completion. Proper settings to achieve a desired sintering density are readily and easily determined by the user from trial sinterings within the pressure and temperature limits set forth herein. Pressures in excess of 100 psi are commonly employed. Lower pressures are largely ineffective, particularly at lower temperatures.

The molds employed to produce products of the present invention may be of any size, shape and pattern desired. Critical features of the molds employed are the dimensional accuracy of the internal surface and the temperature resistance and rigidity of the materials employed. A preferred mold design for controlling final pressure and sintered product thickness, illustrated in FIG. 2, employs a movable top plate 4 and a rigid bottom plate 5 which has a recessed ledge or press stop 6. In practice, a premeasured quantity of thermoplastic polymer powder is introduced into the bottom mold cavity 5 and tapped or shaken to create a densified powder compact 7. The top plate 4 is then placed on top of the mold, inserted into a constant temperature oven or laminating press and heated to the desired sintering temperature under pressure, said pressure being applied to the top cover 4 by a piston 8 shown in FIG. 3. As sintering progresses the powder compact volume decreases until the top mold cover rests on the polishing stop 6. Pressure is retained for the desired length of time, the mold is cooled, and the final part 9 of precisely determined thickness 10 is removed.

Although a wide variety of thermoplastic materials are commercially available and usable as starting materials in the present invention, the range of utility may be considerably enhanced by employing mixtures of two different thermoplastic powders. By intimately mixing two materials, composite structures may be produced which have mechanical properties which may be different than either material individually, and dissimilar material mixtures may be produced from materials which cannot be synthesized directly due to material compatibilities. Of particular utility is the use of a mixture wherein one of the components has a lower melting point than the other. When such a mixture is processed by the present invention at a temperature not to exceed the melting point of the lower melting component, sintering may be effected with significantly less chance of distortion, and is thus preferred.

The distinctive features and advantages of the present invention can be further understood by studying the following examples, which are not meant to be restrictive in any way. Through the study of these examples and the above description, other uses and applications will become apparent to those skilled in the art.

EXAMPLE 1

Samples of several different thermoplastic polymers including polyurethanes (Texin 480A, Texin 455D, Texin 470D and Texin 970D manufactured by Miles Inc., Pittsburgh, Pa., and Isoplast 302 manufactured by Dow Chemical Co., Midland, Mich.) as well as nylon 66 were cryogenically milled into powder. The mean particle diameter of each powder was 50 microns. Melting temperatures of the powders were measured using a Fisher-Johns melting point apparatus. Melting point data is given in Table 1.

TABLE 1

Melting points of polymer powders

| Material | Melting point (° C.) |
| --- | --- |
| Texin 470D | 230 |
| Texin 970D | 210 |
| Isoplast 302 | 200 |
| Texin 455D | 230 |
| Texin 480A | 225 |
| nylon 66 | 260 |

Figure 2:
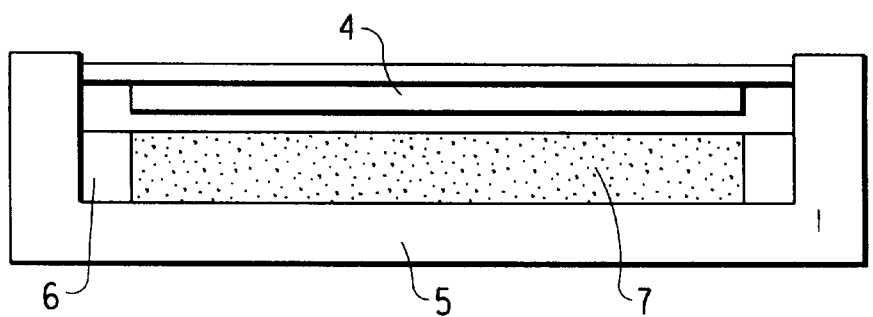
FIG. 2 is a cross-section drawing of a mold in an open position of a type which might be used to form a pad by the process of the present invention.
Figure 3:
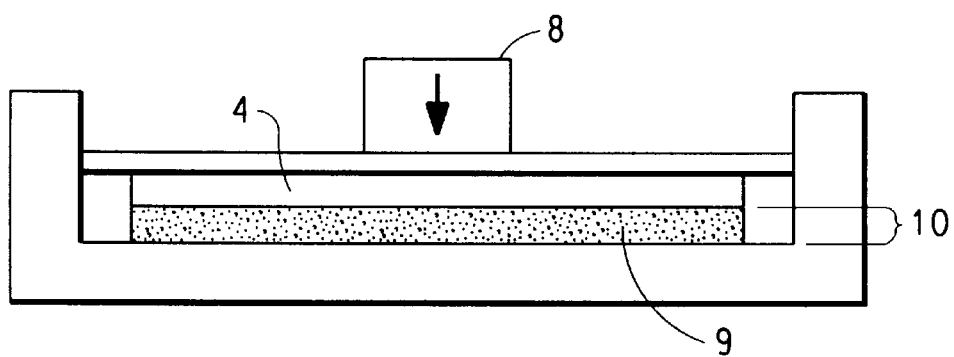
FIG. 3 is a cross-section drawing of the mold of FIG. 2 in the closed position.

Sintering tests were conducted on each of these materials at various temperatures using a 12 in. diameter press mold of design shown in FIG. 2. The stop depth selected was 0.062 in. for a total mold depth of 0.125 in., allowing 2:1 compaction. Dimensional tolerancing of the mold cavity was ±0.001 in. Samples were pressed by first filling the mold cavity with powder in a uniform fashion, gently vibrating the powder, and scraping off excess powder in the mold to ensure that the entire volume of the mold cavity was uniformly filled with starting material. The top portion of the mold was then placed onto the powder fill and the entire mold assembly placed in a heated press at room temperature and 150 psi pressure applied to the top portion of the mold. The entire assembly was then heated to the desired temperature and held for 20 minutes to effect sintering. At this point pressure was released and the mold removed and allowed to cool to room temperature before removing products for examination.

In all cases, powder pressed at room temperature showed essentially no sintering. Samples pressed at temperatures above the melting point showed nearly complete sintering to a dense non-porous solid. A significant degree of adhesion to the mold was also observed. In contrast, for all materials tested, a temperature range of 175–200° C. yielded a strong resilient sintered product which did not exhibit adhesion to the mold. Examination of products sintered in this region showed a high degree of internal porosity and good interparticle sintering. All products sintered in this temperature range showed good air and water permeability. Sintered pad thickness in all cases was 0.062 in, exactly corresponding to the mold stop depth. Dimensional variation was ±0.001 in, again precisely corresponding to the mold surface dimensions and thickness. Surface quality of the products showed them to be extremely smooth and uniform; comparable to commercial polishing pads.

EXAMPLE 2

Several mixtures of plastic powders were processed using the procedure outlined in Example 1. A sintering temperature of 200° C. was employed. Mixtures tested are listed in Table 2 below.

TABLE 2

Powder mixtures used in sintering tests

| Component 1 | Component 2 | Component 3 |
| --- | --- | --- |
| Texin 470D 50% | Isoplast 302 50% | |
| Texin 470D 20% | Isoplast 302 80% | |
| Texin 470D 80% | nylon 66 20% | |
| Texin 470D 50% | Texin 970D 50% | |
| Texin 470D 33.33% | Isoplast 302 33.33% | nylon 66 33.33% |

All sintered products showed good flexibility, strength, dimensional precision and porosity, fully equivalent to the best single material samples of Example 1.

EXAMPLE 3

Another top mold plate was prepared which had a series of concentric projecting rings on its inner surface. Pitch spacing was 0.030 in, with a projecting depth of 0.015 in. and a projection width of 0.013 in. This top plate was substituted for the original top plate and used to sinter samples of 970D powder using optimal conditions identified in Example 1. The resulting product had a top surface which had a pattern of concentric circular grooves of a precise mirror image of the projecting concentric circular grooves of the mold surface. Dimensions and dimensional precision were found to be equivalent to the mold, as in the other examples. All portions of the product, including the regions between grooves on the top surface were of uniform porosity.

EXAMPLE 4

A sintered product pad made from Texin 470D polymer using the procedures outlined in Example 1 was tested for planarization polishing activity and results compared to a commercially available polishing pad, IC1000 (Rodel, Inc.), which is currently widely employed as a planarization pad. Experimental conditions used are given in Table 3 below.

TABLE 3

| Parameter | Setting |
| --- | --- |
| Polisher | Strasbaugh 6CA |
| Table speed | 100 rpm |
| Spindle speed | 60 rpm |
| Load | 7 psi |
| slurry used | ILD1300 silica slurry |
| slurry flow rate | 100 ml/min |
| polish time | 2 minutes |
| pad conditioning | no |
| wafer type | 4 in. diameter thermal oxide on Si |

Figure 4:
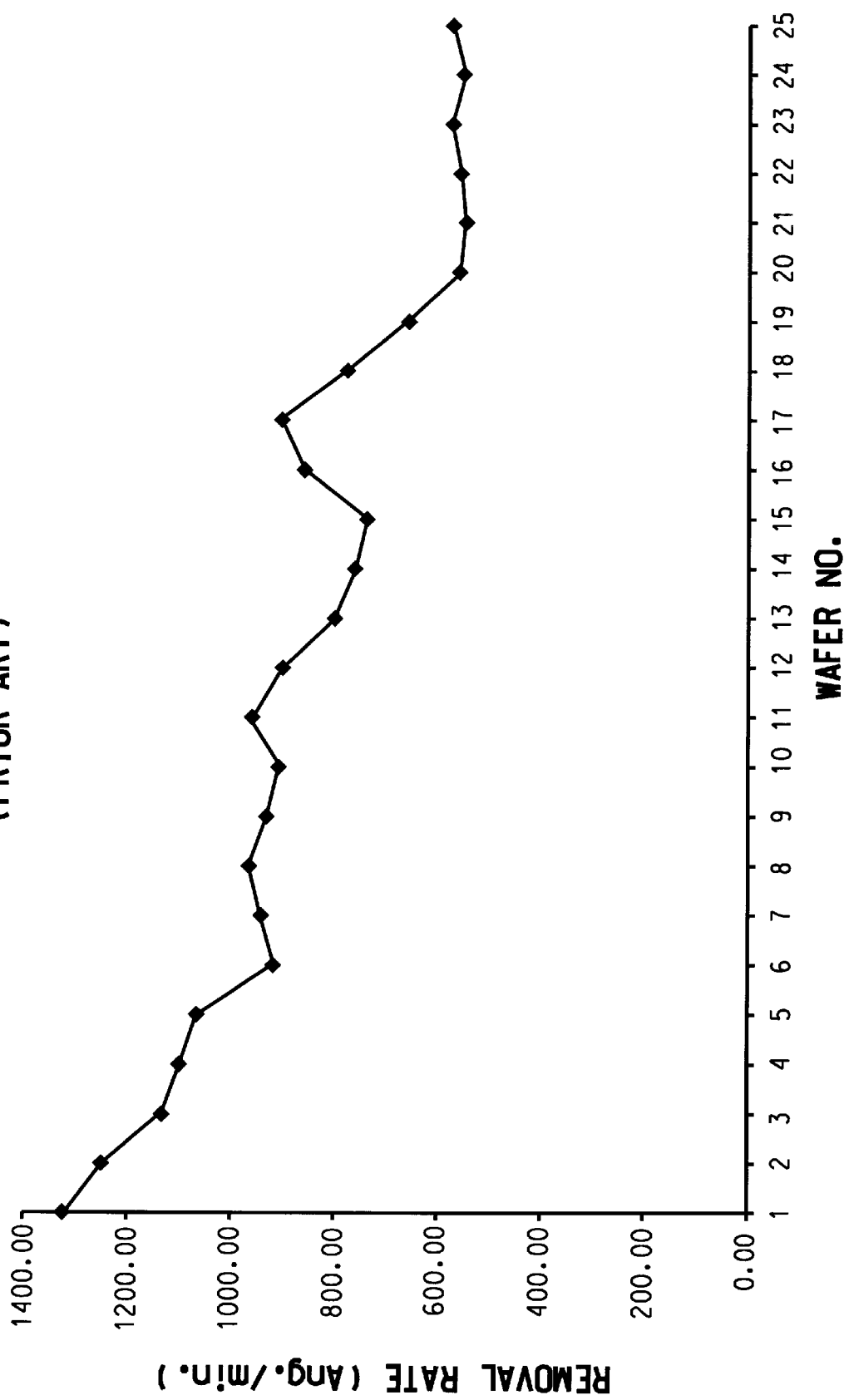
FIG. 4 is a graph of workpiece surface removal rate versus time in use for a polishing pad of the prior art.
Figure 5:
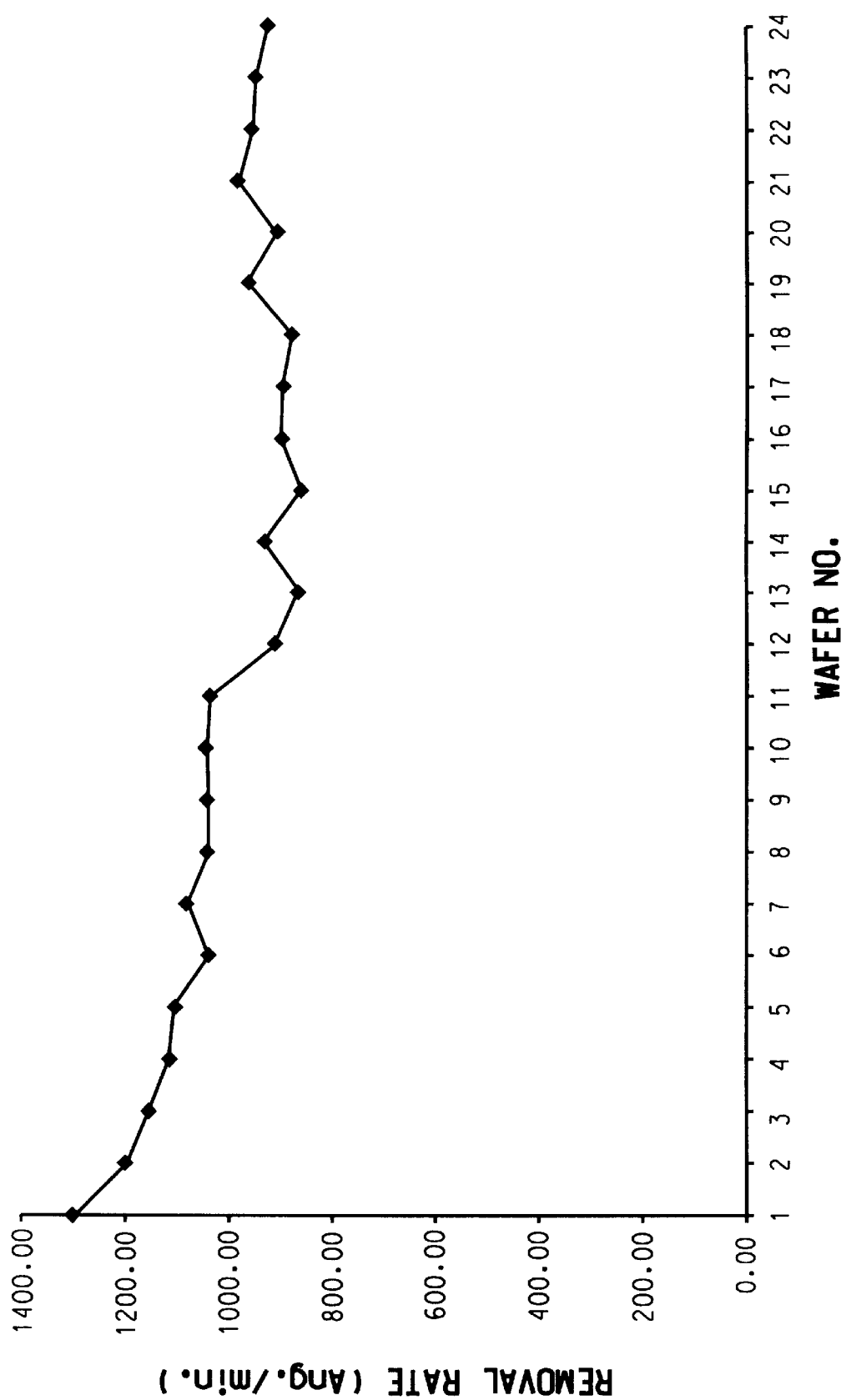
FIG. 5 is a graph of workpiece surface removal rate versus time in use for a polishing pad of the present invention.

The IC1000 pad showed an initially high polishing rate of 1300 Å/min. which decayed steadily to a lower rate of 550 Å/min by the twentieth wafer processed. This is graphically illustrated in FIG. 4. In contrast, the polishing pad of the present invention showed considerably improved rate and rate stability. The initial polishing rate observed was again 1300 Å/min. This decreased to a constant rate of 950 Å/min by the twelfth wafer. This is graphically illustrated in FIG. 5. Thus the pad of the present invention exhibited both significantly increased rate stability and increased rate.

EXAMPLE 5

A sintered product pad made from 455D polymer using the procedures outlined in Example 1 was tested for Silicon polishing activity. Experimental conditions are summarized in Table 4 below.

TABLE 4

| Parameter | Setting |
| --- | --- |
| Polisher | Strasbaugh 6CA |
| Table speed | 100 rpm |
| Spindle speed | 60 rpm |
| Load | 7 psi |
| slurry used | Nalco 2350 |
| slurry flow rate | 100 ml/min |
| polish time | 20 minutes |
| wafer type | 4 in. diameter [110] Si |

A series of 25 wafers was polished. Polishing rate was initially 0.4 microns/min, and rapidly increased to a constant value of 0.8 microns/min. The polishing rate obtained was comparable to that obtained using conventional Si polishing pads such as Suba IV (Rodel, Inc.). However, wafer flatness and surface quality as observed by Nomarski microscopy were markedly superior to results obtained with conventional pads.

Sintered compacts of thermoplastic polyurethanes were also fabricated from aqueous slurries of thermoplastic polyurethane powders. In some cases, small amounts of either or both isopropanol or water soluble polymers such as poly (vinyl alcohol) can be added to improve rheology and the strength of the compact prior to sintering.

EXAMPLE 6

Powdered Texin 470D (100 g) was mixed with deionized water (144 g) to give a paste. This was poured into a circular mold as shown in FIG. 2 and dried at 100° C. for 6 hours. After drying the sample was pressed in the closed mold at 150 psi and sintered at 180° C. for 25 minutes to give a pad having a density of 0.8 g/cm$^3$ and 35% porosity.

EXAMPLE 7

Powdered Texin 470D was mixed with a poly(vinyl alcohol)/water/isopropanol solution to form a paste which was poured into a circular mold as shown in FIG. 2. After drying at 100° C. for 6 hours, the compact was cohesive. The compact was then pressed in the mold at 150 psi and sintered at 185° C. for 25 minutes to give a sintered pad containing 1 wt % poly(vinyl alcohol). The pad appeared to have uniform packing density. Density and porosity were 0.9 g/cm$^3$ and 27% respectively.

EXAMPLE 8

Figure 6:
FIG. 6 is a photomicrograph of a cross-section of a pad of the present invention.

A pad was made from Texin 470D as described in Example 1. The average particle size of the starting powder was about 60 microns. It was processed in a mold which had a grooved upper surface so that the surface of the pad produced had grooves molded into it. Process conditions were 190° C. for 15 minutes at 150 psi pressure. The powder was compacted to about 66% of it original thickness. As can be seen on FIG. 6, a photomicrograph of a cross-section of the finished pad, the particles essentially retain their original shape and appear to be point bonded to surrounding particles.

We claim:

1. A method of polishing a semiconductor wafer comprising:
    (a) contacting a surface of said semiconductor wafer with a surface of a pad material,
    (b) providing an abrasive slurry between said surface of said semiconductor wafer and said surface of said pad material, and
    (c) moving said surface of said semiconductor wafer and said surface of said pad material relative to each other to polish said surface of said semiconductor wafer;
    wherein said pad material is uniform in all directions and said pad material consists of a uniform continuously interconnected polymer of greater than 50% of the gross volume of said pad material, said pad material being produced by sintering thermoplastic polymer powder particles in a mold at a temperature above the glass transition temperature of said polymer but not to exceed the melting point of said polymer and at a pressure in excess of 100 psi, conditions for producing said pad material being such that said polymer powder particles from which said pad material is produced essentially retain their original shape and are point bonded to form said pad material.

2. A method of polishing a semiconductor wafer according to claim 1 wherein said polymer powder particles comprise a mixture of two or more thermoplastic polymer powders, each having a different melting point, and wherein said sintering is carried out at a temperature above the glass transition temperature of the lowest melting polymer but not to exceed the melting point of said lowest melting polymer.

3. A method of polishing a semiconductor wafer according to claim 1 wherein said polymer powder particles comprise more than one thermoplastic polymer powder or mixture of thermoplastic polymer powders, each having different mechanical properties, which are deposited in said mold in layers aligned substantially parallel to said surface of said pad material so as to produce a pad material having multiple layers with different mechanical properties and wherein said sintering is carried out at a temperature above the glass transition temperature of the lowest melting polymer in each layer but not to exceed the melting point of the lowest melting polymer.

4. A method of polishing a semiconductor wafer according to claim 1, 2, or 3 wherein said surface of said pad material has a macroscopic texture of dimensions greater than 1 mm produced by providing a reverse shape form in said mold used to effect said sintering.

5. A method of polishing a semiconductor wafer according to claim 1, 2, or 3 wherein said surface of said pad material has a microscopic texture of dimensions between 0.01 mm and 1 mm produced by providing a reverse shape form in said mold used to effect said sintering.

6. A method of polishing a semiconductor wafer according to claim 1, 2, or 3 wherein said polymer powder or powders employed have a mean particle diameter of between 20 and 100 microns.

7. A method of polishing a semiconductor wafer according to claim 1 wherein said polymer powder is a polyurethane.

8. A method of polishing a semiconductor wafer according to claim 1 wherein said polymer powder is a polyamide.

* * * * *